(12) United States Patent
Mohan

(10) Patent No.: US 11,399,038 B2
(45) Date of Patent: Jul. 26, 2022

(54) CYBERSECURITY WITH EDGE COMPUTING

(71) Applicant: Schlumberger Technology Corporation, Sugar Land, TX (US)

(72) Inventor: Apurva Mohan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 456 days.

(21) Appl. No.: 16/675,493

(22) Filed: Nov. 6, 2019

(65) Prior Publication Data

US 2020/0145440 A1 May 7, 2020

Related U.S. Application Data

(60) Provisional application No. 62/756,444, filed on Nov. 6, 2018.

(51) Int. Cl.
*H04L 9/40* (2022.01)
*G06N 5/04* (2006.01)
*G06N 20/00* (2019.01)

(52) U.S. Cl.
CPC .......... *H04L 63/1425* (2013.01); *G06N 5/04* (2013.01); *G06N 20/00* (2019.01); *H04L 63/1433* (2013.01)

(58) Field of Classification Search
None
See application file for complete search history.

(56) References Cited

U.S. PATENT DOCUMENTS

| | | | |
|---|---|---|---|
| 10,333,898 B1* | 6/2019 | Moore | H04L 69/16 |
| 2016/0330219 A1* | 11/2016 | Hasan | G06N 5/025 |
| 2020/0106793 A1* | 4/2020 | Vanamali | H04L 63/1433 |

* cited by examiner

*Primary Examiner* — Cai Y Chen

(57) ABSTRACT

The disclosure provides for a two-stage method for analyzing data from an oil and gas field operation site for cyber threats. The method includes, in a first stage of analysis, filtering captured events using local edge computing at the site to perform initial cyber anomaly detection by applying classification models to the captured events, forming filtered data. The method includes transmitting the filtered data to a second stage of analysis and, in the second stage of analysis, analyzing the filtered data in a cloud by applying system context and referring vulnerability databases. The disclosure provides for a system for analyzing data, including an edge computing device that includes computer instructions to filter captured events to perform initial cyber anomaly detection, forming filtered data. The system includes a cloud-based ML cluster to implement a second stage of analysis to analyze the filtered.

20 Claims, 6 Drawing Sheets

CYBERSECURITY WITH EDGE COMPUTING

FIELD

The present disclosure relates to methods, systems, and apparatus for cyber threat detection using edge computing.

BACKGROUND

Cyber threat detection in an industrial internet of things (IoT) operations environment is of paramount importance. The size and complexity of the problem has lent this area well to automated threat detection techniques aided by machine learning (ML) methods.

However, most of the ML methods rely of collecting data from the field site and performing analysis in the cloud. Unfortunately, oil and gas field operations do not fit well into this model. Various infrastructural and governance issues, like intermittent connectivity, low bandwidth, expensive communications links, and cloud data residency issues in some countries, make this model a misfit for oil and gas field operations. ML algorithms systems are typically deployed in passive mode to observe internet protocol (IP) network traffic. Events are sent to an analysis engine that is deployed in the cloud or on premises. Most such products are domain agnostic and are, thus, deployed in both information technology (IT) and operations technology (OT).

Such systems primarily serve a filtering function to assist the security operations center (SoC) analyst in focusing on high likelihood events. Security events and telemetry data are transmitted wirelessly via communications infrastructure to a cloud-based ML cluster, and then to a security operations center.

However, ML algorithms have minimal to no knowledge of the domain or deployment context, which often leads to misfit. For example, ML algorithms lead to: (1) false positives and negatives, including unforeseen events/blind spots; (2) have high uplink bandwidth requirements (e.g., oil and gas operations usually support satellite or cellular); (3) require high resource usage for edge analytics (e.g., edge analytics competes with other computations); (4) has a high latency for initiating response (e.g., the round trip time from cloud); and (5) creates a data explosion (e.g., a significant number of single, low information data points). Furthermore, ML algorithms create a partial picture, with an IP network only approach that lacks insights about devices, non-IP traffic, and wireless. Also, ML algorithms may be non-resistant to ML-specific attacks, such as biased learning and evasion attacks.

BRIEF SUMMARY

One aspect of the present disclosure includes a two-stage method for analyzing data from an oil and gas field operation site for cyber threats. The method includes, in a first stage of analysis, filtering captured events using local edge computing at the site to perform initial cyber anomaly detection by applying classification models to the captured events, forming filtered data. The method includes transmitting the filtered data to a second stage of analysis. The method includes, in the second stage of analysis, analyzing the filtered data in a cloud by applying system context and referring vulnerability databases.

Another aspect of the present disclosure provides for a cyber threat analysis system for analyzing data from an oil and gas field operation site for cyber threats. The system includes an edge computing device, including computer instructions to implement a first stage of analysis to filter captured events at the site to perform initial cyber anomaly detection by applying classification models to the captured events, forming filtered data. The system includes a cloud-based ML cluster, including computer instructions to implement a second stage of analysis to analyze the filtered data by applying system context and referring vulnerability databases.

BRIEF DESCRIPTION OF THE DRAWINGS

So that the manner in which the features of the compositions, articles, systems and methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

Compositions, articles, systems, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Figure 1:
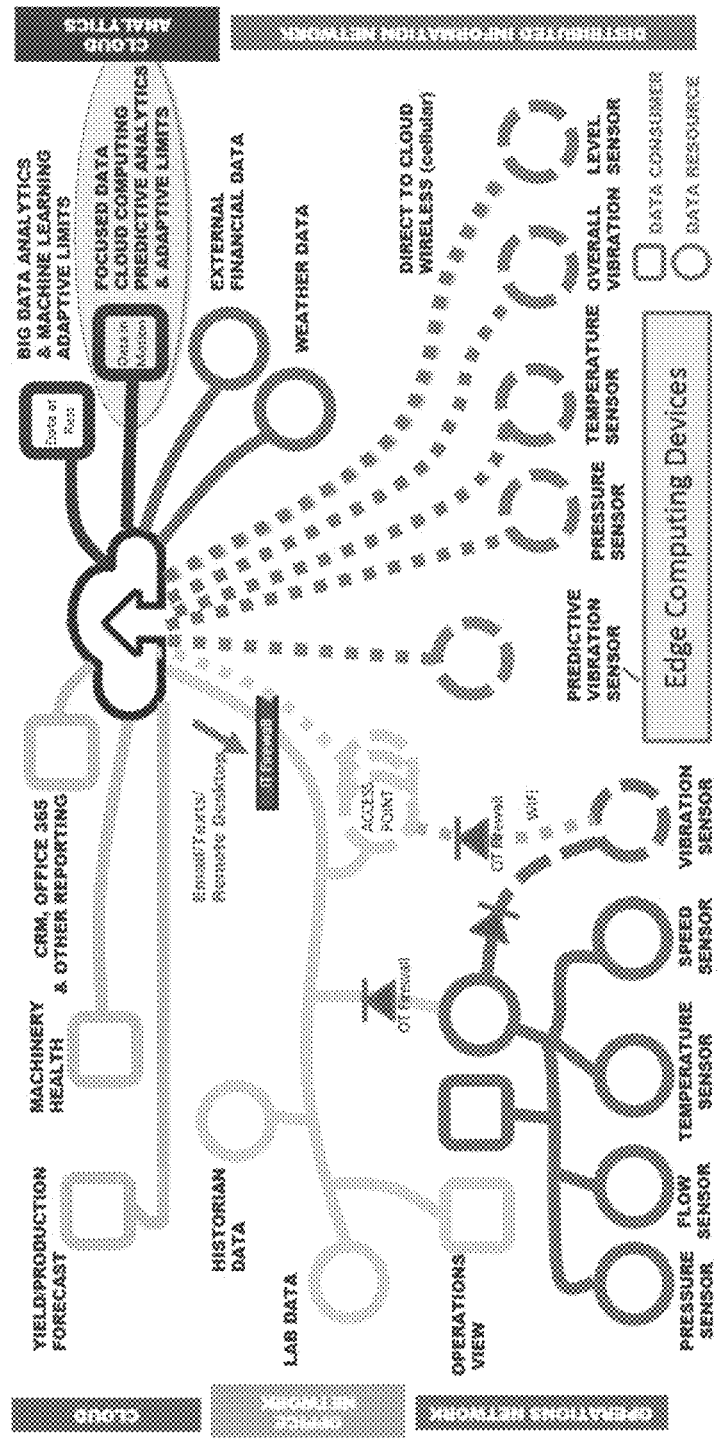
FIG. 1 depicts one example of a command and control system, for use with sensing devices in oil and gas field operations, that relies on automated anomaly detection based on unsupervised ML algorithms.
Figure 2:
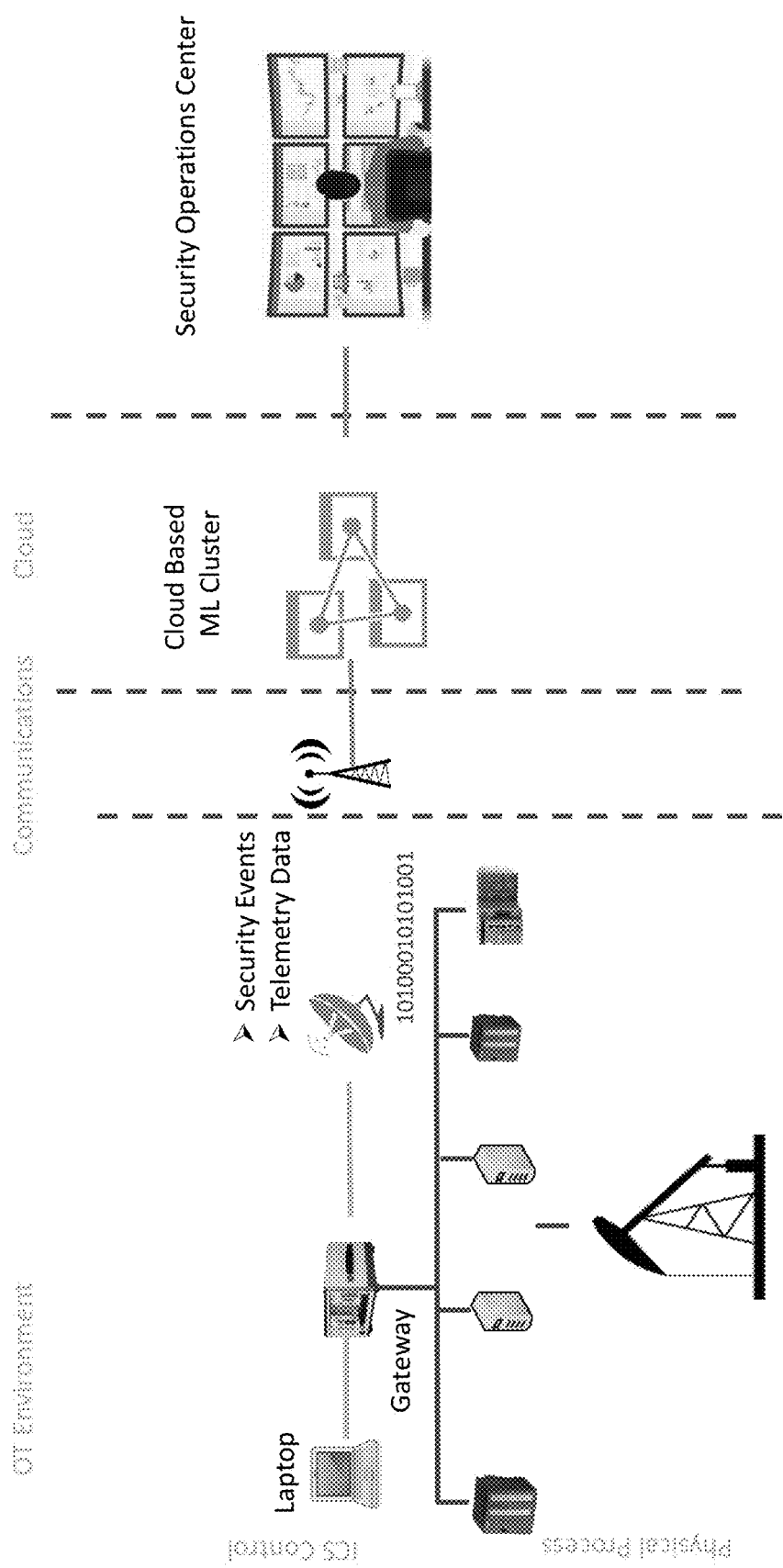
FIG. 2 depicts an oil and gas field site and communications network, including a cloud-based ML cluster and a security operations center.
Figure 3:
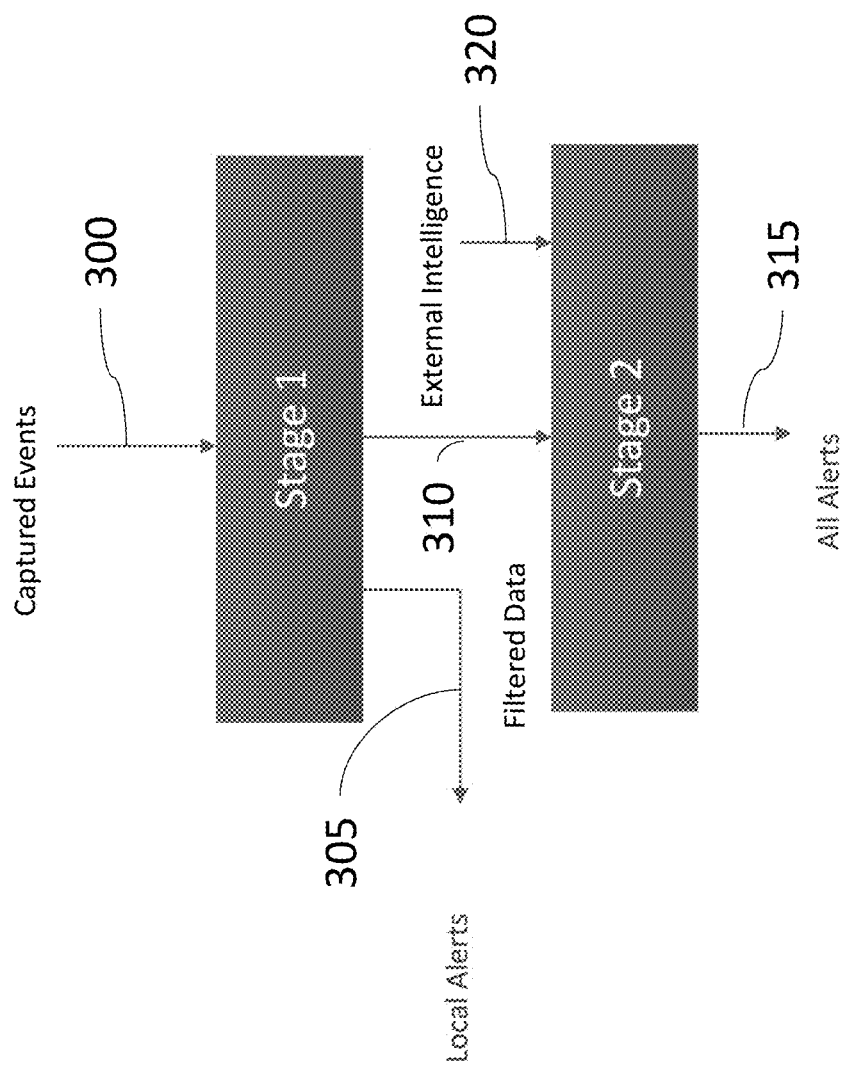
FIG. 3 depicts a simplified schematic of a two-stage model of cyber threat analysis.

The present disclosure includes methods, systems, and apparatus for cyber threat detection using edge computing. FIG. 1 depicts one example of a command and control system, for use with sensing devices in oil and gas field operations, that relies on automated anomaly detection based on unsupervised ML algorithms. FIG. 2 depicts a simplified diagram of an ML-based system, with physical processes at the operations site communicating via a gateway with industrial control systems (ICS) control. In some aspects, a two-stage model is employed to detect cyber threats at an industrial IoT operations environment, such as at an oil and gas field operations site. In the two-stage model, local edge computing at the field site is employed to perform initial anomaly detection by applying classification models to captured events. With reference to FIG. 3, captured events 300 are subjected to a first stage of filtering and/or analysis, identified as "stage 1" in FIG. 3. Captured events 300 may include, but are not limited to, data from pressure sensors, flow sensors, temperature sensors, speed sensors, vibration sensors, level sensors, weather data, external financial data, historian data, lab data, or any other data that may be produced at the oil and gas field operations site. Captured events 300 are filtered via local edge computing at the field site to perform the initial anomaly detection by applying classification models to captured events 300. The classification models can be now known or future known classification models that one skilled in the art with the aid of this disclosure would know.

Filtering of captured events 300 forms local alerts 305, filtered data 310 which, in combination with external intelligence 320, may be transmitted to "stage 2" of the two-stage model. The local alerts 305 can be a safety alert that is issued when predefined safety limits, such as a max pressure or other predefined threshold for the relevant system.

Such filtered data 310 and external intelligence 320 may include only cyber threat events of interest. Stage 2 includes selectively transmitting such events of interest (i.e., filtered data 310 and optionally external intelligence 320) to the cloud for further analysis by applying the system context and referring to a vulnerability databases. The external intelligence can be obtained from open source databases or other public databases that have information on cyber threat events, paid databases offered by commercial companies, or combinations thereof.

Analysis in stage 2 may form alerts 315. Thus, the two-stage model, as shown in FIG. 3, includes a first stage, stage 1, where local anomaly detection is performed using all captured events 300. Stage 1 may utilize edge analytics, resident on dedicated hardware or available devices, to analyze captured events 300. Stage 1 may be capable of detecting highly critical events, with the possibility of some false positives. Furthermore, the computational capabilities of stage 1 may exhibit local survivability in the case of network failures to cloud. Furthermore, the two-stage model, as shown in FIG. 3, includes a second stage, stage 2, where global scale anomaly detection is performed based on filtered data 310. In stage 2, cloud analytics may be performed on relatively high-performance servers. Stage 2 of the two-stage model may leverage global visibility to all sites, and may be capable of detecting all potential security events with a relatively low occurrence of false positives.

Figure 4:
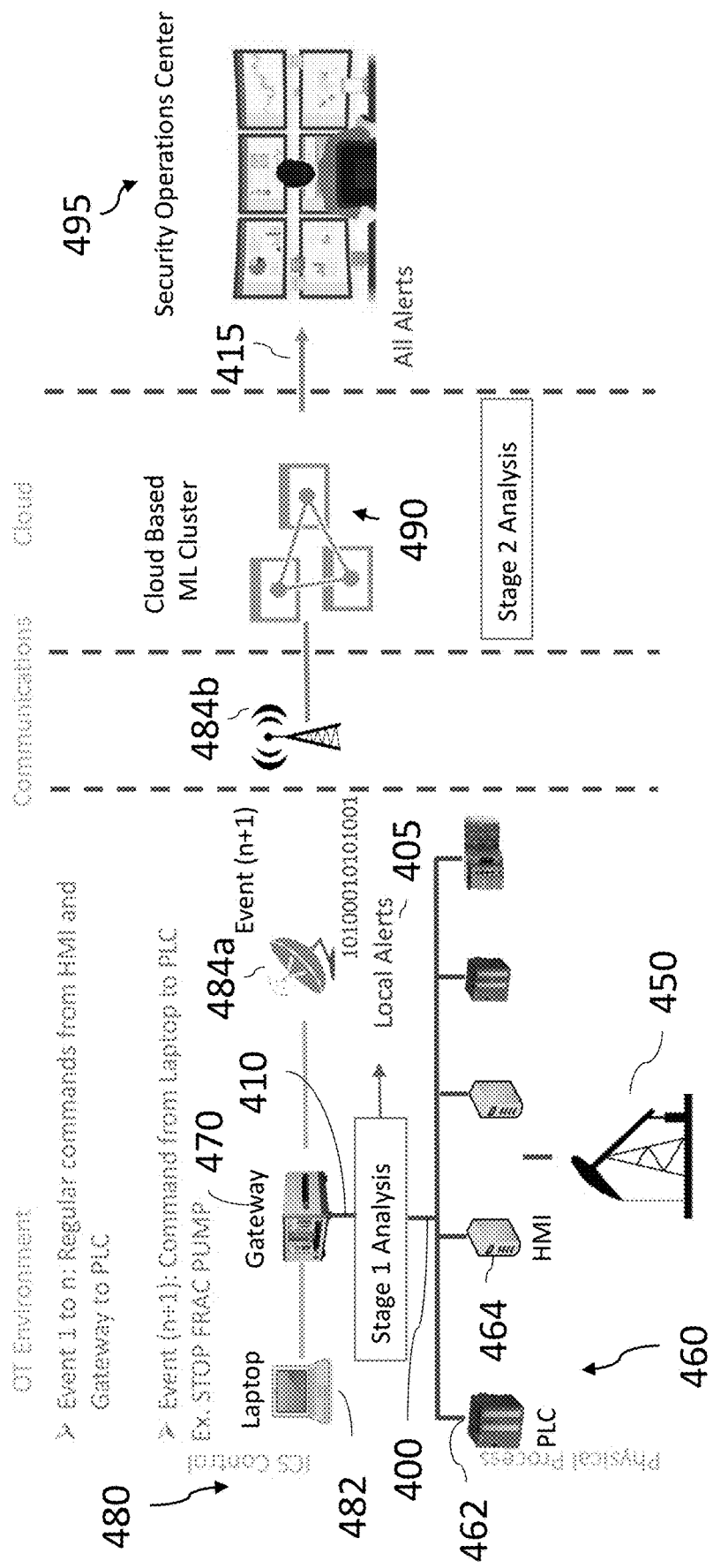
FIG. 4 depicts an oil and gas field site and communications network similar to that of FIG. 2, but with a two-stage model of cyber threat analysis incorporated therein.

With reference to FIG. 4, a two-stage model for oil and gas field operations site 450 is depicted. Captured events 400 (e.g., data) from any of various physical processes 460 at site 450, such as those of programmed logic controllers, PLC 462, and human machine interfaces, HMI 464, are transmitted to "stage 1 analysis" of the two-stage model. Within the stage 1 analysis, captured events 400 are filtered via local edge computing at the site 450 to perform the initial anomaly detection by applying classification models to captured events 400. This filtering of captured events 400 forms local alerts 405 and filtered data 410. Filtered data 410, optionally in combination with external intelligence is transmitted via gateway 470 to ICS control 480, including laptop 482, and is transmitted via communications equipment 484a and 484b (e.g., satellites and/or cellular towers) to cloud-based ML cluster 490.

ML cluster 490 performs the "stage 2 analysis" of the two-stage model, wherein the filtered data from stage 1 is analyzed by applying the system context and referring to the vulnerability databases, resulting in the formation of alerts 415, which may be transmitted to security operations center 495.

Figure 5:
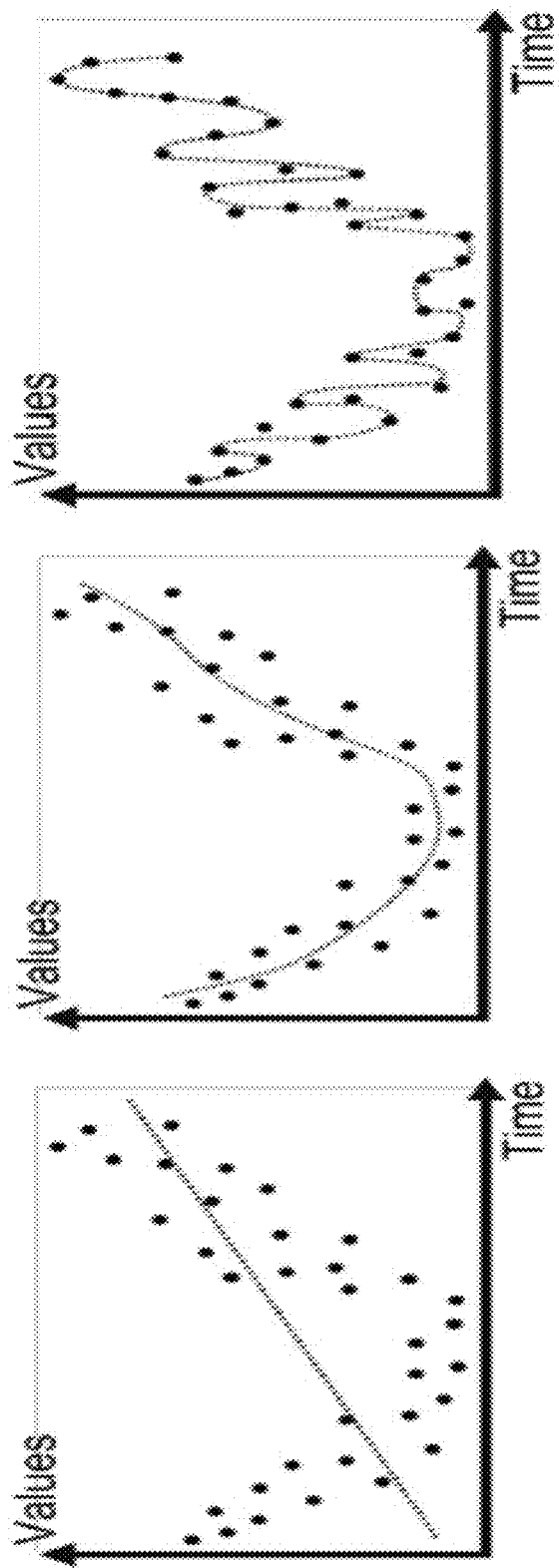
FIG. 5A is a graph of values vs. time for an underfitted model.
FIG. 5B is a graph of values vs. time for a good fit/robust model.
FIG. 5C is a graph of values vs. time for an overfitted model.
Figure 6:
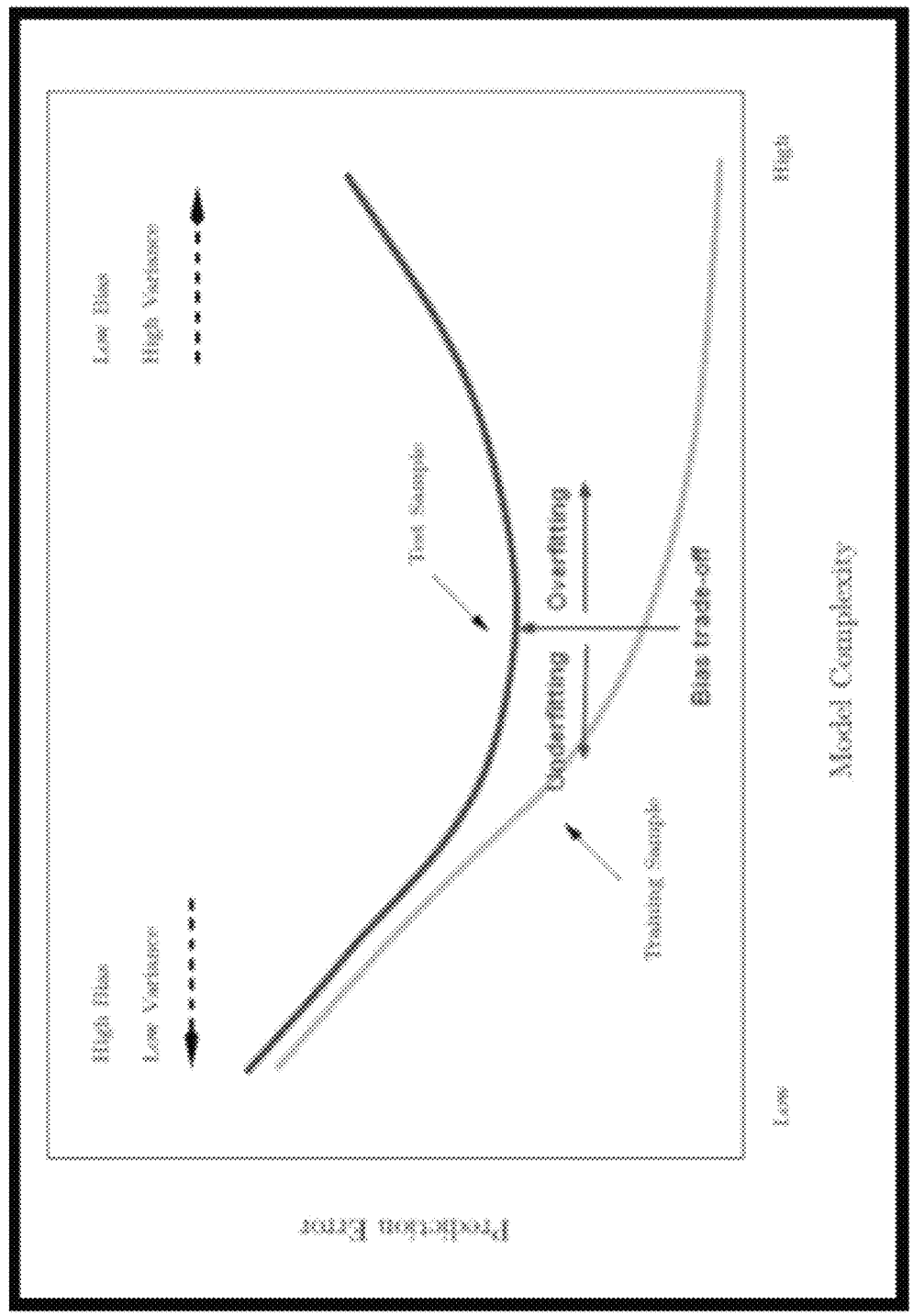
FIG. 6 is a graph of prediction error vs. model complexity.

With reference to FIGS. 5A-5C and 6, limited knowledge or overly permissive system design at the edge may result in losing security threat events of interest due to false negatives. Furthermore, overly sensitive system designs may result in a high rate of false positives, leading to resource wastage due to transmission of useless information over expensive communications links, which may compete with the transmission of valuable telemetry data. FIG. 5A depicts a graph of values vs. time where the threat detection is underfitted, such that false positives occur as a result of the ML model being underfit at the edge. This results in a high number of false alerts to the cloud, higher bandwidth consumption, and higher data transfer price. FIG. 5C depicts a graph of values vs. time where the threat detection overfitted, such that false negatives occur as a result of the ML model being overfit at the edge. This results in undetected security events and insufficient forensic data archived in the cloud. FIG. 5B depicts a graph of values vs. time with a relatively good/robust fit is exhibited, such that false negatives and false positives are minimized. FIG. 6 depicts a graph of prediction error vs. model complexity for a test sample and a training sample, showing the results of underfitting and overfitting, and the bias tradeoff. As shown, low bias results in high variance, and high bias results in low variance.

A design of the two-stage model that balances the concerns of both false negatives and false positives optimally ensures that the security mechanism remains an enabler and does not cannibalize resources from the primary functionality of data ingestion from industrial IoT systems. Utilizing the present two-stage model, advanced threat detection may be enabled in oil and gas field sites with minimal use of precious resources. Also, the small size of events of interests during intermittent connectivity makes it easier to store the events to provide local survivability of such events during communications disruptions.

The present two-stage model provides suitable threat analysis for oil and gas industrial IoT environments. Security analytics at the edge meet the requirements of such applications, including the ability to operate with intermittent connectivity, low bandwidth, high communications cost, and data explosions.

All computer instructions disclosed herein may be stored on a non-transitory, computer readable medium.

In operation, if a gateway is deployed at a wellsite, the gateway would be configured to do the stage 1 analysis. For example, have a local database of security events, computer instructions to cause the processor on the gateway to level 1 alerts by performing anomaly detection and comparing the captured data with the database of security events and perform pattern recognition on historical operation of the gateway. Level 1 alerts can be issued when the anomalies have a high likelihood that the detected anomalies are a security incident. For example, from comparison to the local database, or a variation from normal expected behavior learned from past behavior. Accordingly, machine learning is deployed at the gateway to identify normal behavior and identifies when behavior deviates from normal behavior and uses the local database along with classification models to identify security events.

The gateway also has computer that cause the processor to filter captured and send data the needs further analysis to the cloud for additional processing. The cloud can be configured to perform the level 2 analysis and issue level 2 alerts based on running the models with the captured data and external data.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A two-stage method for analyzing data from an oil and gas field operation site for cyber threats, the method comprising:
   in a first stage of analysis, filtering captured events using local edge computing at the site to perform initial cyber anomaly detection by applying classification models to the captured events, forming filtered data;
   transmitting the filtered data to a second stage of analysis; and
   in the second stage of analysis, analyzing the filtered data in a cloud by applying system context and referring to vulnerability databases.

2. The method of claim 1, wherein, in the first stage of analysis, edge analytics, resident on dedicated hardware or available devices, are used to analyze the captured events.

3. The method of claim 1, wherein the first stage of analysis is capable of detecting highly critical events.

4. The method of claim 1, wherein computational capabilities of the first stage of analysis exhibit local survivability in the case of network failures to the cloud.

5. The method of claim 1, wherein the filtering of the captured events using local edge computing forms local alerts at the site.

6. The method of claim 1, wherein the filtered data is transmitted to the second stage in combination with external intelligence.

7. The method of claim 1, wherein the filtered data, and optionally external intelligence, includes only cyber threat events of interest.

8. The method of claim 1, further comprising, in the second stage of analysis, forming alerts of cyber threats based on the second stage of analysis.

9. The method of claim 1, wherein, in the second stage of analysis, global scale anomaly detection is performed based on the filtered data.

10. The method of claim 1, wherein, in the second stage of analysis, the flirted data is analyzed using cloud analytics that is performed on servers.

11. The method of claim 1, wherein the second stage of analysis is capable of detecting all potential security threats.

12. The method of claim 1, wherein the captured events are transmitted from physical processes at the site to the first stage of analysis.

13. The method of claim 12, wherein the captured events include data from include programmed logic controllers and human machine interfaces.

14. The method of claim 1, wherein the filtered data is transmitted from to the second stage of analysis via a gateway and communications equipment.

15. The method of claim 1, wherein the analysis of the filtered data in the second stage of analysis is performed using cloud-based ML clusters.

16. The method of claim 1, wherein alerts are formed based on the second stage of analysis.

17. The method of claim 16, wherein the alerts are transmitted to a security operations center.

18. A cyber threat analysis system for analyzing data from an oil and gas field operation site for cyber threats, the system comprising:
   an edge computing device, the edge computing device including computer instructions to implement a first stage of analysis to filter captured events at the site to perform initial cyber anomaly detection by applying classification models to the captured events, forming filtered data;
   a cloud-based ML cluster, the cloud-based ML cluster including computer instructions to implement a second stage of analysis to analyze the filtered data by applying system context and referring to vulnerability databases.

19. The system of claim 18, wherein, in the first stage of analysis, edge analytics, resident on the edge computing device, are used to analyze the captured events.

20. The system of claim 18, wherein the first stage of analysis is capable of detecting highly critical events.

* * * * *